UNITED STATES PATENT OFFICE.

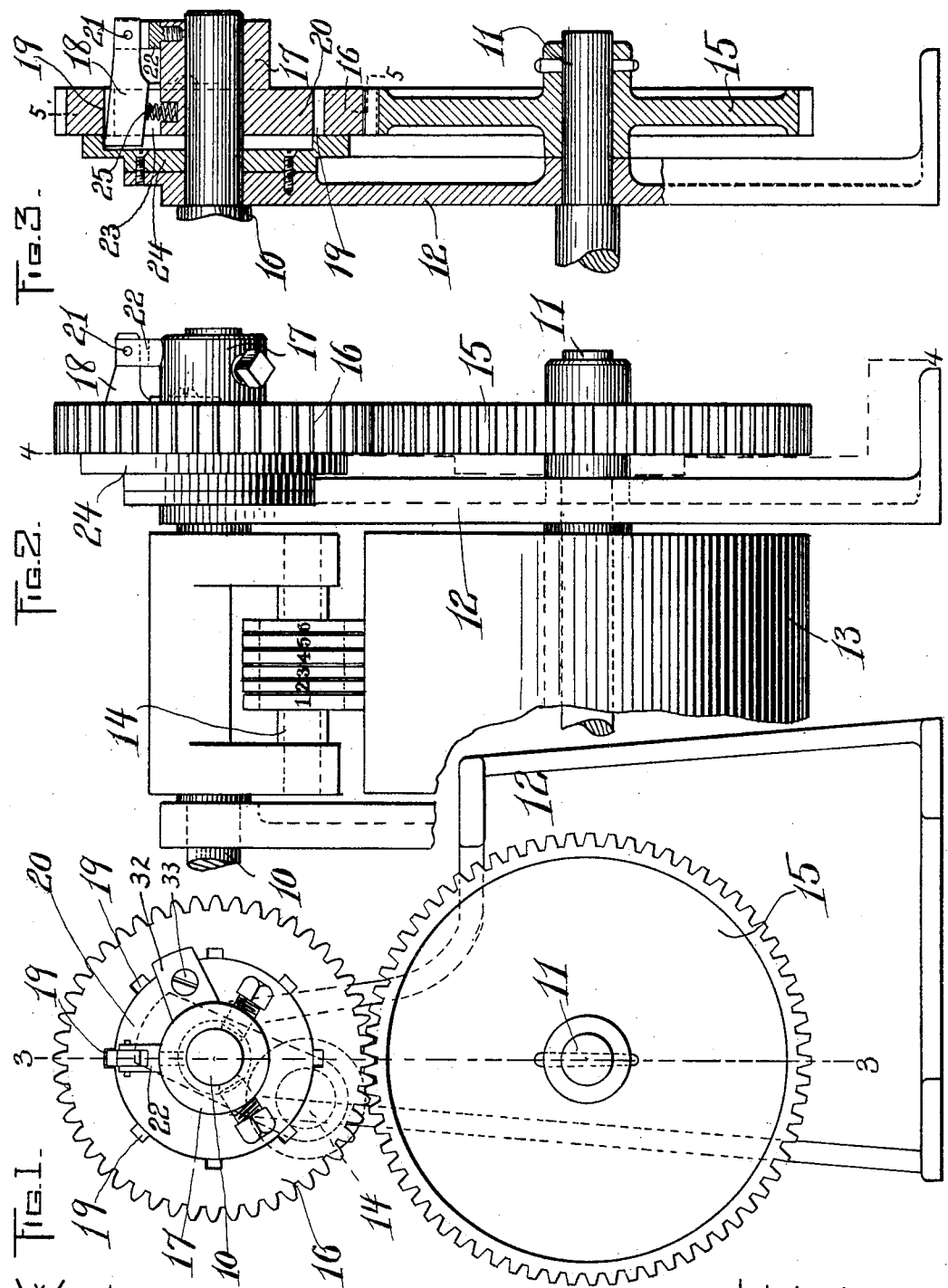

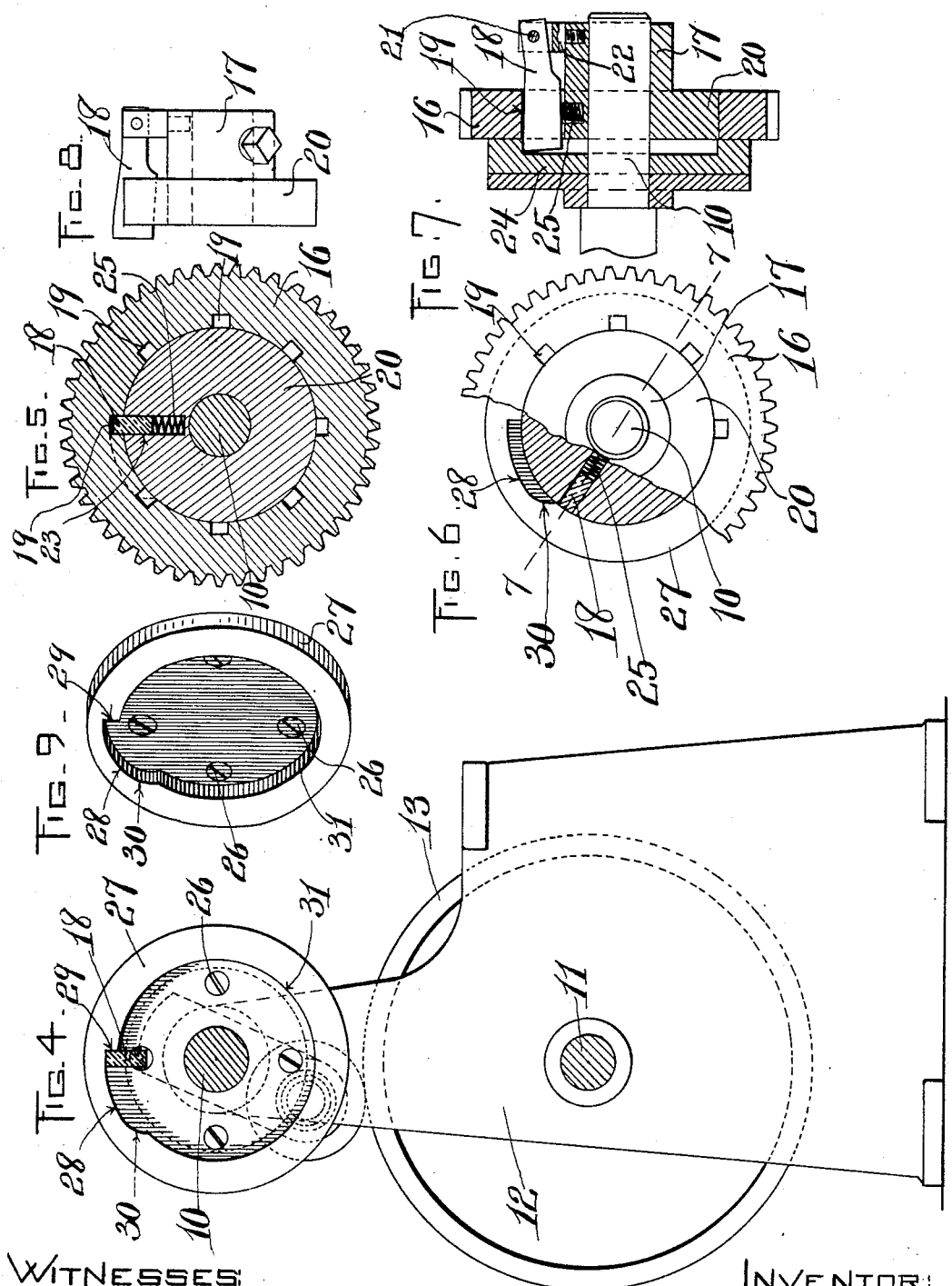

ALBERT H. RAY, OF ASHLAND, MASSACHUSETTS.

MECHANICAL MOVEMENT.

SPECIFICATION forming part of Letters Patent No. 701,088, dated May 27, 1902.

Application filed August 11, 1900. Serial No. 26,598. (No model.)

*To all whom it may concern:*

Be it known that I, ALBERT H. RAY, of Ashland, in the county of Middlesex and State of Massachusetts, have invented certain new and useful Improvements in Mechanical Movements, of which the following is a specification.

This invention has relation to mechanical movements or mechanism for transferring power or motion from one element to another, and while it relates more particularly to movements of the class utilized in printing-machines to secure the intermittent synchronous actuation of the printing members at the same peripheral speed, yet by reason of the results achieved thereby it is adapted for utilization in other types and kinds of machines where it is desirable or necessary to obtain an intermittent rotation of one or more elements from a continuous rotation of another.

The principal objects of the invention and in what the latter consists are fully set forth in the following specification, taken in connection with the accompanying drawings, to which reference may now be had.

Figure 1 represents in end elevation a mechanical movement embodying the invention. Fig. 2 represents a front elevation of the same. Fig. 3 represents a section on the line 3 3 of Fig. 1. Fig. 4 represents a section on the line 4 4 of Fig. 2. Fig. 5 represents a section on the line 5 5 of Fig. 3 with the pawl in engagement with the gear. Fig. 6 represents the pawl disengaged from the gear and the latter in position to permit the pawl to engage a notch therein. Fig. 7 represents a section on the line 7 7 of Fig. 6. Fig. 8 illustrates the pawl and its carrier. Fig. 9 represents the cam detached.

The embodiment of the present invention, which is shown upon the accompanying drawings and which I shall now proceed to describe, is adapted for use in the machine shown in my Patent No. 607,131, dated July 12, 1898, for securing an intermittent synchronous movement of the printing members in peripheral unison and may be substituted for the mechanism therein illustrated by which this result is attained.

On the drawings, 10 indicates the driving member, and 11 the driven member, both of which are illustrated as shafts journaled in a frame 12. The printing members or couple, if such instrumentalities are used in connection with the invention, are mounted upon the shafts, the impression-cylinder 13 being secured upon the driven member 11 and the chase or printing-cylinder 14 being secured upon the driving member 10. Power may be imparted to the driving member 10 from any suitable source for securing its rotation.

Upon the end of shaft 11 is pinned the hub of a gear-wheel 15, the latter intermeshing continuously with and being rotated by a gear-wheel 16, adapted to be clutched positively and intermittently to the driving-shaft 10, by which it is supported.

The ratio of the radii of the two gears is equal to that of the radii of the two members 13 14 of the printing-couple, so that when the gear-wheel 16 is positively clutched to the driving member the said members of the printing-couple move in peripheral unison.

The driving member may be rotated continuously from the instant of engagement until the instant of release, in which event the driven member receives, by reason of the employment of the clutch mechanism, to be described, a regular intermittent rotation, starting at a predetermined speed, which it maintains until completely released. Thus the ratio of rotations between the members of the printing-couple may be as $l$ to $n$, ($n$ equaling any number of rotations,) while the peripheral movement of the members is synchronous, the driving member rotating continuously and the driven member receiving an intermittent or step-by-step rotative movement.

The clutch mechanism is cam-controlled, and it is inserted between the gear 16 and the shaft 10. It consists of a carrier 17, upon which for convenience the last-mentioned gear is journaled, and a movable key, clutch member, or pawl 18 thereon adapted to be engaged successively with internal notches or engaging portions 19 of the gear. The said carrier consists of a hub rigidly secured to shaft 10 and having a peripheral flange 20 to receive the gear, the latter being held against axial movement by means to be described. The key, pawl, or clutch member is fulcrumed or pivoted at one end on a pin 21, carried by a stud 22, screwed into the hub of the carrier, and it projects through a radial slot 23 in the flange into operative position with respect to a cam 24, being held yieldingly in a direction away from the hub by a coiled spring 25.

The cam consists of a plate rigidly secured by screws 26 to the frame 12 and having a flanged rim 27 arranged concentrically of the driving shaft or member 10. The inner wall of the rim 27 is cut away, as at 28, the length of the cut-away portion being equal to the distance between any two of the notches or engaging portions 19 of the gear or a multiple thereof. The cut-away portion forms a socket for the reception of the pawl, and it permits the pawl to be yieldingly moved outward into engagement with one of the notches. The socket terminates at one end with the sharp radial shoulder 29, and at the other end it converges more or less gradually, as at 30.

If the ratio of rotations of the members of the couple is as $l$ to $n$, the length of the socket is $\frac{l}{n}$ of the internal circumference of the flanged rim or cam. Consequently when the pawl-carrier has been rotated far enough for the pawl to slide outward into the socket past the shoulder 29 it engages one of the notches in the gear and carries the gear with it until it is disengaged from the notch by the inclined end wall 30 of the socket. The rotation of the gear is sufficient in duration to bring the next successive notch into a position to receive the pawl after the pawl-carrier has completed its revolution and the pawl is again allowed to slide outward into the socket past the shoulder 29. The concentric inner wall 31 of the flanged rim or cam holds the pawl out of contact with the gear 16. The said gear 16 is held against axial movement in one direction by the cam and in the other direction by a clip 32, which is secured to the flange of the carrier 17 by a screw 33. (See Fig. 1.) It is evident that the length of the socket 28 and the number of notches in the gear may be varied to secure a different ratio of rotations between the two members of the couple and also that a variety of changes may be made in the construction of the parts which I have described without departing from the spirit and scope of the invention.

According to the foregoing description it will be seen that I have provided, first, a combination of instrumentalities comprising a unidirectionally-moving driving element, (shaft 10,) a concentric driven element, (gear 16 in this case,) and an automatically-controlled movable key or clutch member for intermittingly connecting the driven element positively with the driving element to cause it to rotate in unison therewith and to remain at rest alternately, and, second, another combination of instrumentalities comprising a couple of coöperating members, (the printing-couple,) with mechanism, including continuously-meshing gearing, interposed between said members, and an automatic clutch member for alternately engaging said gearing with and releasing it from one of said members to cause said member to rotate intermittently in exact peripheral unison with the other member.

Having thus explained the nature of the invention and described a way of constructing and using the same, though without attempting to set forth all of the forms in which it may be made or all of the modes of its use, it is declared that what is claimed is—

1. A mechanical movement comprising two concentric unidirectionally-movable elements one within the other, one driving and the other driven, and automatic radially-movable clutch mechanism interposed between said elements, whereby the one element is positively intermittently rotated at a speed equal to that of the other, and permitted to rest, alternately.

2. A mechanical movement comprising two unidirectionally-movable concentric elements one within the other, one driving and the other driven, and automatic radially-movable mechanism interposed between said elements, whereby during a continued rotation of the driving element, the driven element is for alternate periods of time, successively positively rotated and permitted to rest.

3. A mechanical movement comprising two unidirectionally-movable concentric elements one within the other, one driving and the other driven, a positive radially-movable clutch member, and a cam for automatically causing the actuation of said clutch member whereby during continued rotations of the driving element, the driven element is for alternate predetermined periods of time, rotated and permitted to rest.

4. A mechanical movement comprising two unidirectionally-movable concentric elements one within the other, one driving and the other driven, a radially-movable spring-pressed positive clutch member rotatable with the driving element and adapted to successively engage engaging portions of the driven element, and a stationary cam for causing the actuation of said clutch member; whereby during continued rotations of the driving element, the driven element is for alternate predetermined periods of time rotated and permitted to rest.

5. A mechanical movement comprising a driving-shaft, a driven wheel thereon having internal notches, a stationary cam, and a carrier within said wheel and having a radially-movable clutch member controlled by said cam, and adapted to be engaged with and released from the successive notches in the wheel.

6. A mechanical movement comprising two rotatable members mounted for peripheral coöperation, a driven shaft on which one of said members is mounted, a unidirectionally-rotating driving-shaft for the other member adapted to rotate while the driven shaft is at rest, and intervening power-transmitting mechanism, including coacting gears, whereby the driven shaft is automatically partially rotated by the driving-shaft for predetermined periods of time at a predetermined speed with predetermined alternating periods of rest.

7. A mechanical movement comprising two rotatable members mounted for peripheral coöperation, a driven shaft on which one of said members is mounted, a driving-shaft rotatable while the driven shaft for the other member is at rest, gearing interposed between said shafts, and automatic clutch mechanism, whereby the driven shaft is partially rotated for predetermined periods of time with alternating periods of rest.

8. A mechanical movement comprising two rotatable members mounted for peripheral coöperation, a driven shaft on which one of said members is mounted, a driving-shaft for the other member rotatable while the driven shaft is at rest, gearing connecting said shafts, a cam, and cam-controlled clutch mechanism between the gearing and one of said shafts, whereby the driven shaft is alternately partially rotated and held at rest.

9. A mechanical movement comprising two rotatable members mounted for peripheral coöperation, a driven shaft on which one of said members is mounted, a driving-shaft for the other member rotatable while the driven shaft is at rest, gearing between said shafts and rigidly connected to one of said shafts, a carrier, an automatic clutch member adapted to intermittently connect the gearing with the other of said shafts, and means for positively disconnecting the clutch upon a partial rotation of the driven shaft.

10. The combination, with a couple of coöperating members mounted for peripheral coöperation, one of which is adapted to remain at rest at intervals during the rotation of the other member; of mechanism for causing the first-mentioned member to partially rotate intermittently in exact peripheral unison with the other member, said mechanism including continuously-meshing gears interposed between said members, and an automatic clutch for intermittently connecting the gears with one of said members.

11. The combination, with a couple of coöperating members mounted for peripheral coöperation, one of which is adapted to remain at rest at intervals during the rotation of the other member; of mechanism for causing the first-mentioned member to partially rotate intermittently in exact peripheral unison with the other member, continuously-meshing gears interposed between said members, a clutch member interposed between the gears and one of said members, and a cam for automatically controlling said clutch member at regular intervals.

12. The combination, with a couple of coöperating members, one of which is adapted to remain at rest at intervals during the rotation of the other member; of mechanism for causing the first-mentioned member to rotate intermittently in exact peripheral unison with the other member, said mechanism including shafts supporting and rotating said members, continuously-meshing gears between said shafts, a clutch member carried by one of said shafts and adapted to intermittingly and positively engage the gear thereon, and a stationary cam for automatically controlling said clutch member.

In testimony whereof I have affixed my signature in presence of two witnesses.

ALBERT H. RAY.

Witnesses:
MARCUS B. MAY,
P. W. PEZZETTI.